G. F. MEYER.
NON-SLIPPING AND NON-SKIDDING DEVICE.
APPLICATION FILED AUG. 22, 1916.
1,294,510.
Patented Feb. 18, 1919.
2 SHEETS—SHEET 1.
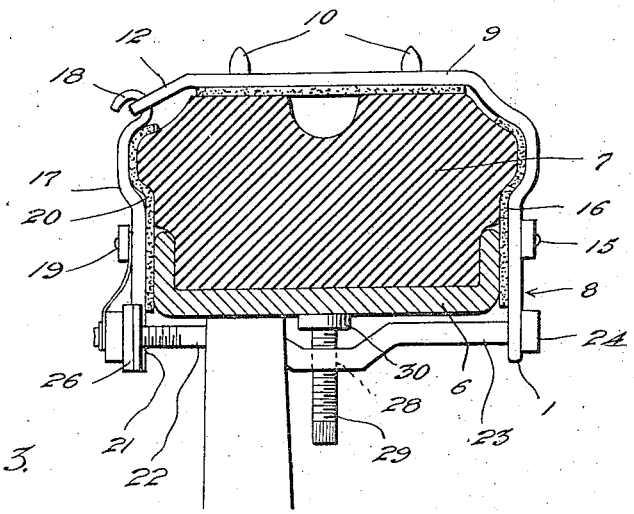
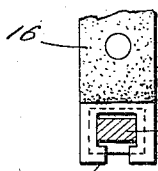
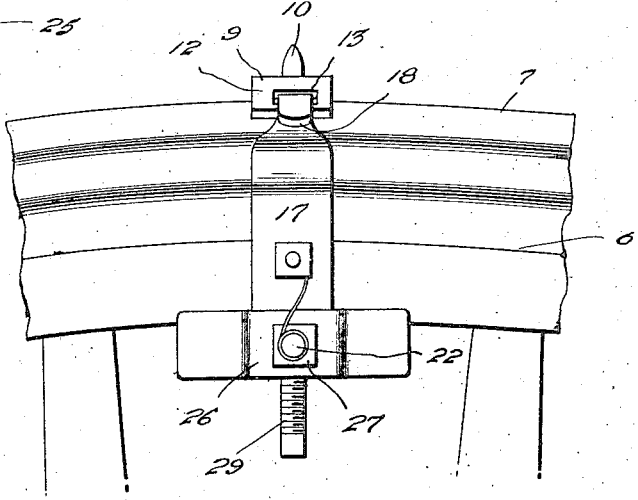
Witness
P. M. Hunt
N. A. Minnett
Inventor
Gustave F. Meyer
By John Louis Waters & Co.
Attorney

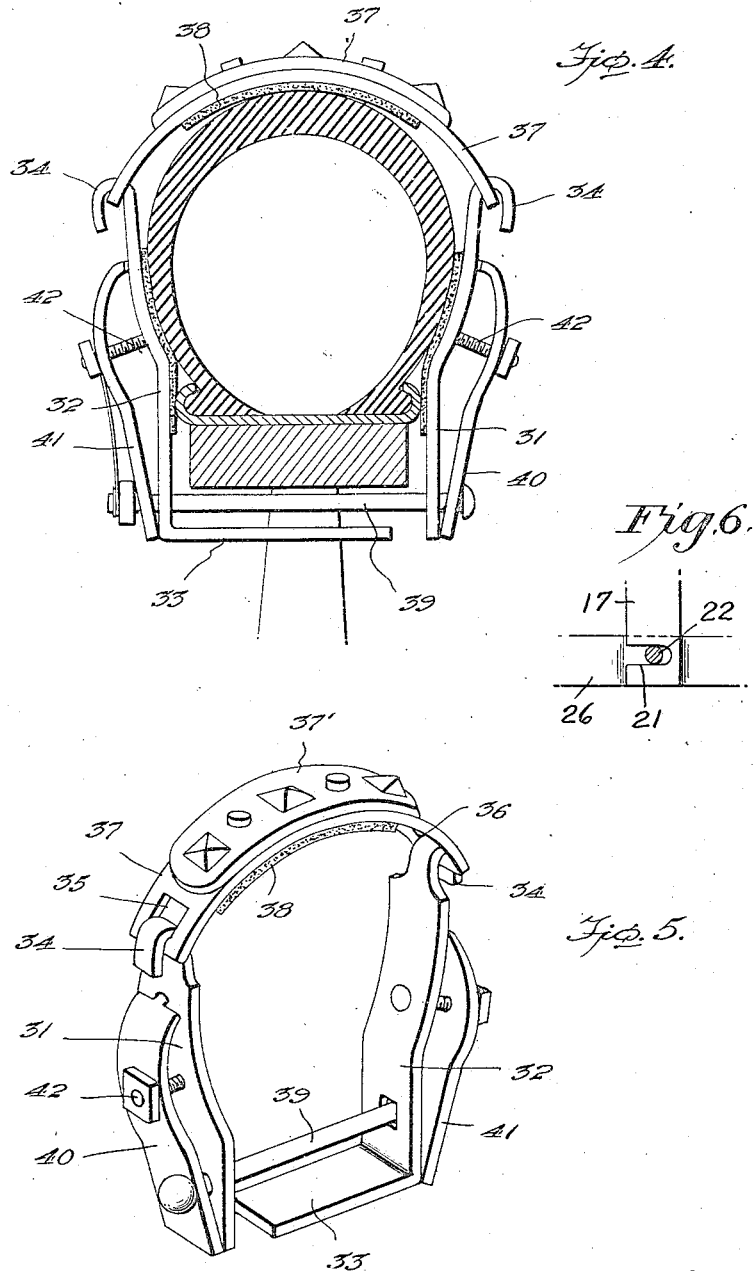

UNITED STATES PATENT OFFICE.

GUSTAVE F. MEYER, OF TROY, NEW YORK.

NON-SLIPPING AND NON-SKIDDING DEVICE.

1,294,510.  Specification of Letters Patent.  Patented Feb. 18, 1919.

Application filed August 22, 1916.  Serial No. 116,287.

*To all whom it may concern:*

Be it known that I, GUSTAVE F. MEYER, a citizen of the United States, residing at Troy, in the county of Rensselaer and State of New York, have invented certain useful Improvements in Non-Slipping and Non-Skidding Devices, of which the following is a specification, reference being had therein to the accompanying drawing.

This invention relates to improvements in a non-slipping and non-skidding device for wheels, one object of the invention being the provision of a device of this character which is readily attached to surround the tire and felly of a wheel and be secured thereto in a fixed manner, the same having all of the advantages and none of the disadvantages of the chain devices now employed.

A further object of this invention is the provision of a device of this character which is quickly clamped upon or released from the wheel and which provides surface engaging means that will insure the proper gripping action of the wheel upon slippery roads, due to water, mud, or ice, there being novel means provided for securing the device in place against circumferential movement.

A still further object of this invention is the provision of a device of this character which is so constructed as to be quickly applied and disconnected, which is simple, durable and inexpensive in construction, and which is thoroughly efficient and practical in use.

In the accompanying drawings:—

Figure 1 is a cross section through a truck wheel adjacent the rim and tire thereof, showing the present device in operable connection thereto.

Fig. 2 is a fragmentary side elevation of the form shown in Fig. 1.

Fig. 3 is a fragmentary detail view of the device *per se*.

Fig. 4 is a fragmentary side elevation of another form of the invention.

Fig. 5 is a perspective view of the device *per se* as shown in Fig. 4.

Fig. 6 is a fragmentary detail view.

Referring to the drawings, and more particularly to Figs. 1, 2 and 3 thereof, the reference numeral 6 designates the felly of the wheel and 7 the tire.

The present device 8 includes the strip 9 which is provided with the creepers 10 upon the tread portion thereof, and with the slotted terminal 11, the opposite terminal 12 being bent downwardly and provided with the aperture 13.

Secured by means of the bolt 15 to the inner side of the member 8 is a strap 16 of flexible material which prevents the device from marring the wheel.

A plate 17 provided with the hooked terminal 18 is adapted to fit upon the opposite side of the rim of the wheel, and by means of the bolt or rivet 19 carries a flexible strip 20.

The opposite end of the plate 17 is provided with a transverse slot 21 which receives the threaded terminal of a bar 23. The terminal on the opposite portion 23 of the bar is formed with a knob 24 while the portion 23 is designed to be removably fitted in the slotted terminal 11 in the member 8 as shown in Fig. 3.

Another plate 26 has its outer portion offset forming opposed shoulders and this plate is also formed with an opening so as to be engaged on the projecting threaded end of the bolt 22 to allow the opposed shoulders to straddle the plate or member 17 in such a manner that the shoulders abut the opposite sides of the said plate. A nut 27 is adjustably mounted on the threaded portion of the bolt 22 and is adjustable to clamp the device firmly upon the tire 7 as shown in Figs. 1 and 2.

In order to insure of a further clamping of the present device in place, the connecting bar is provided with the interiorly threaded aperture 28 in which fits the threaded shank 29 of the felly engaging foot 30, the opposite end of the shank being shouldered to receive a wrench.

By this means the shank may be rotated to cause the felly engaging member to securely engage the under side of the felly and thus tend to clamp the device more firmly in place.

In the construction of the device shown in Figs. 4 and 5, two members 31 and 32, one of which is provided with the right-angled portion 33, are each provided with the outwardly extended hooks 34 for engaging the respective slots 35 and 36 of the tire engaging member 37 which has secured thereto the creeper carrying member 37′, the under side of the same being lined with the strip 38 of soft material, preferably leather.

The bolt 39 is extended through the members 31 and 32 and also the resilient clamping plates 40 and 41, so that the present device is clamped firmly in place. Each one of the clamping plates has threaded therein an adjusting screw 42 which is adapted to bear against its respective members 31 or 32 and thus more firmly clamp the present device upon the rim and tire. In this manner, either one of the present devices may be readily and firmly secured in place.

What I claim as new is:—

1. A device of the character described, including a substantially L-shaped creeper carrying member, a plate having a hook on its outer terminal adapted to removably engage the outer terminal of the L-shaped member, a securing bar having one terminal detachably engaged in the opposite terminal of the L-shaped member and also detachably engaged in the opposite terminal of the plate, and means engageable with the bar for preventing accidental displacement of the bar and holding the L-shaped member and the plate in position.

2. A device of the character described, including a substantially L-shaped creeper carrying member, a plate having a hook on its outer terminal adapted to removably engage the outer terminal of the L-shaped member, a securing bar having one terminal detachable engaged in the opposite terminal of the L-shaped member and also detachably engaged in the opposite terminal of the plate, means engageable with the bar for preventing accidental displacement of the bar and holding the L-shaped member and the plate in position, and means carried by the bar for engaging the felly for increasing the tension of the bar.

3. A device of the character described, including a substantially L-shaped member carrying creepers, one of the terminals thereof being provided with an opening and the other terminal being provided with a slot, a plate having a hook and said hook being adapted to fit in the aperture of the first member, the opposite terminal being provided with a transverse slot, and a securing bar having one terminal fitting in the slot of the L-shaped member and the other terminal engaged in the transverse slot in the plate.

4. A device of the character described, including a substantially L-shaped member carrying creepers, one of the terminals thereof being provided with an opening and the other terminal being provided with a slot, a plate having a hook and said hook being adapted to fit in the aperture of the first member, the opposite terminal being provided with a transverse slot, and a clamping bar having a head upon one end for embracing the slotted end of the first member, the opposite end thereof being threaded and extended through the transverse slot, a plate fitting over the end of the second member and closing the transverse slot, a nut for engaging the extended end of the bar for holding the members from separation, and means carried by the bar for engaging the felly for increasing the tension of the bar.

In testimony whereof I affix my signature.

GUSTAVE F. MEYER.